(12) United States Patent
Ahmed et al.

(10) Patent No.: US 7,516,226 B2
(45) Date of Patent: Apr. 7, 2009

(54) TRANSMIT ADAPTIVE EQUALIZATION USING ORDERED SETS

(75) Inventors: Ali U. Ahmed, Macungie, PA (US); Robert D. Brink, Coopersburg, PA (US); Lane A. Smith, Easton, PA (US); Robert Snively, Morgan Hill, CA (US)

(73) Assignees: Agere Systems Inc., Allentown, PA (US); Brocade Communications Systems, Inc., San Jose, CA (US)

( * ) Notice: Subject to any disclaimer, the term of this patent is extended or adjusted under 35 U.S.C. 154(b) by 761 days.

(21) Appl. No.: 10/955,997

(22) Filed: Sep. 30, 2004

(65) Prior Publication Data

US 2006/0067387 A1 Mar. 30, 2006

(51) Int. Cl.
 *G06F 15/16* (2006.01)
(52) U.S. Cl. .................. 709/228; 370/236; 375/229
(58) Field of Classification Search ......... 709/200–202, 709/224–228; 370/230, 437, 395.21, 236; 455/522; 375/229–236
 See application file for complete search history.

(56) References Cited

U.S. PATENT DOCUMENTS

| | | | | | |
|---|---|---|---|---|---|
| 4,489,416 | A | * | 12/1984 | Stuart | 375/231 |
| 4,995,030 | A | * | 2/1991 | Helf | 370/290 |
| 4,995,057 | A | * | 2/1991 | Chung | 375/231 |
| 6,055,269 | A | * | 4/2000 | Drost et al. | 375/232 |
| 6,205,170 | B1 | * | 3/2001 | Nunez Leon De Santos et al. | 375/219 |
| 6,650,624 | B1 | | 11/2003 | Quigley et al. | |
| 6,748,233 | B1 | * | 6/2004 | Arnold et al. | 455/522 |
| 6,823,023 | B1 | * | 11/2004 | Hannah | 375/296 |
| 6,868,072 | B1 | * | 3/2005 | Lin et al. | 370/276 |
| 7,006,435 | B1 | * | 2/2006 | Davies et al. | 370/230 |
| 7,130,341 | B2 | * | 10/2006 | Haunstein et al. | 375/229 |
| 7,184,475 | B2 | * | 2/2007 | Dohmen et al. | 375/232 |

(Continued)

FOREIGN PATENT DOCUMENTS

EP 05 25 4905 1/2006

OTHER PUBLICATIONS

U.S. Appl. No. 10/933,708, filed Sep. 3, 2004, A.U. Ahmed et al., "Transmit Adaptive Equalization for Communication Systems with One or More Serial Data Channels".

(Continued)

*Primary Examiner*—Moustafa M Meky
(74) *Attorney, Agent, or Firm*—Ryan, Mason & Lewis, LLP

(57) ABSTRACT

In a communication system comprising first and second nodes, a transmit adaptive equalization technique is implemented utilizing ordered sets. The first and second nodes may communicate over a Fiber Channel link or other medium. The first and second nodes comprise respective transmitter and receiver pairs, with the transmitter of the first node configured for communication with the receiver of the second node and the receiver of the first node configured for communication with the transmitter of the second node. The first node is operative to receive from the second node information specifying an adjustment to one or more equalization parameters of the first node. The information is received in designated portions of one or more ordered sets transmitted from the second node to the first node in conjunction with initialization of a communication link between the first and second nodes. The first node adjusts the equalization parameter(s) in accordance with the received information.

21 Claims, 5 Drawing Sheets

U.S. PATENT DOCUMENTS

| | | | |
|---|---|---|---|
| 7,184,477 B2* | 2/2007 | Haunstein et al. | 375/233 |
| 7,277,477 B1* | 10/2007 | Ahmad | 375/220 |
| 7,280,614 B2* | 10/2007 | Brossier et al. | 375/316 |
| 2004/0252699 A1* | 12/2004 | Drevon et al. | 370/395.21 |
| 2005/0070292 A1* | 3/2005 | Liu | 455/450 |
| 2005/0143013 A1* | 6/2005 | Jha | 455/69 |
| 2005/0195894 A1* | 9/2005 | Kim et al. | 375/232 |
| 2008/0137721 A1* | 6/2008 | Hsu et al. | 375/231 |

OTHER PUBLICATIONS

FC-FS-2 Working Draft, Project T11/1619-D Rev 0.30, American National Standard of Accredited Standards Committee Incits., pp. 312-325, Sep. 7, 2004.

* cited by examiner

TRANSMIT ADAPTIVE EQUALIZATION USING ORDERED SETS

FIELD OF THE INVENTION

The present invention relates generally to communication systems, and more particularly to equalization techniques for use in communications systems comprising, by way of example, one or more Fibre Channel links or other serial data channels.

BACKGROUND OF THE INVENTION

As is well known, Fibre Channel (FC) is an American National Standards Institute (ANSI) standard specifying a bidirectional serial data channel, structured for high performance capability. Physically, the Fibre Channel may be viewed as an interconnection of multiple communication points, called N_Ports, interconnected by a link comprising a switching network, called a fabric, or a point-to-point link. Fibre is a general term used to cover all physical media types supported by the Fibre Channel, such as optical fibre, twisted pair, and coaxial cable.

The Fibre Channel provides a general transport vehicle for Upper Level Protocols (ULPs) such as Intelligent Peripheral Interface (IPI) and Small Computer System Interface (SCSI) command sets, High-Performance Parallel Interface (HIPPI) data framing, IP (Internet Protocol), IEEE 802.2, and others. Proprietary and other command sets may also use and share the Fibre Channel, but such use is not defined as part of the Fibre Channel standard.

Fibre Channel is structured as a set of hierarchical functions denoted FC-0, FC-1, FC-2, FC-3 and FC-4.

FC-0 defines the physical portions of the Fibre Channel including the fibre, connectors, and optical and electrical parameters for a variety of data rates and physical media. Coax and twisted pair versions are defined for limited distance applications. FC-0 provides the point-to-point physical portion of the Fibre Channel. A variety of physical media is supported to address variations in cable plants.

FC-1 defines the transmission protocol which includes the serial encoding, decoding, and error control.

FC-2 defines the signaling protocol which includes the frame structure and byte sequences.

FC-3 defines a set of services which are common across multiple ports of a node.

FC-4 is the highest level in the Fibre Channel standard. It defines the mapping, between the lower levels of the Fibre Channel and the IPI and SCSI command sets, the HIPPI data framing, IP, and other ULPs.

Additional details regarding these and other aspects of Fibre Channel can be found in the ANSI Fibre Channel standard documents, including the FC-PH, FC-FS, FC-AL-2, FC-PI, FC-DA, FC-MI and FC-LS documents, all of which are incorporated by reference herein.

In typical conventional practice, Fibre Channel links are designed to operate at data rates of 4.25 Gbps, 2.125 Gbps or 1.0625 Gbps. Although higher data rates are possible, the industry is reluctant to spend money upgrading existing hardware to implement these higher data rates. The problem is that as data rates increase, to the proposed Fibre Channel rates of 8 Gbps, 16 Gbps and higher, the existing hardware degrades the electrical signals to the extent that error-free operation cannot be achieved without electrical equalization.

Current implementations generally attempt to address this problem through the use of pure receive equalization. However, at high data rates, on the order of 8 Gbps or higher, this receive-only equalization approach is very complicated, and requires significant increases in size and power consumption for the associated hardware. Moreover, the receive-only equalization approach may fail to provide desired levels of performance at the high data rates.

Accordingly, what is needed is an improved approach to equalization for Fibre Channel or other serial data channels, which can accommodate higher data rates without the need for hardware infrastructure upgrades while also avoiding the drawbacks of conventional receive-only equalization.

SUMMARY OF THE INVENTION

The present invention provides techniques for transmit adaptive equalization that overcome one or more of the drawbacks of conventional practice.

In accordance with one aspect of the invention, a transmit adaptive equalization technique is implemented in a communication system comprising first and second nodes. The first and second nodes may communicate over a Fibre Channel link or other medium. The first and second nodes comprise respective transmitter and receiver pairs, with the transmitter of the first node configured for communication with the receiver of the second node and the receiver of the first node configured for communication with the transmitter of the second node. The first node is operative to receive from the second node information specifying an adjustment to one or more equalization parameters of the first node. The information is received in designated portions of one or more ordered sets transmitted from the second node to the first node in conjunction with initialization of a communication link between the first and second nodes. The first node adjusts the one or more equalization parameters in accordance with the received information.

In a similar manner, the second node may also adjust one or more of its equalization parameters in accordance with information received in designated portions of one or more ordered sets transmitted from the first node to the second node in conjunction with initialization of the communication link between the first and second nodes. Thus, substantially simultaneous transmit adaptive equalization may be provided for both the first node and the second node, utilizing a plurality of ordered sets transmitted between the first and second nodes in conjunction with initialization of a communication link between those nodes.

In an illustrative embodiment, the ordered sets may comprise training ordered sets transmitted between the first and second nodes, for example, during a speed negotiation process carried out between the first and second nodes in conjunction with initialization of the communication link, or at another suitable time during or after initialization of the link.

Each of the training ordered sets in the illustrative embodiment comprises both a training pattern and equalization parameter adjustment information. For example, a training ordered set transmitted from the first node to the second node may comprise a training pattern that is used by the second node to determine equalization parameter adjustment information for the first node. This training ordered set may also comprise equalization parameter adjustment information for the second node, as determined by the first node. Similarly, a training ordered set transmitted from the second node to the first node may comprise a training pattern that is used by the first node to determine equalization parameter adjustment information for the second node. This training ordered set may also comprise equalization parameter adjustment information for the first node, as determined by the second node.

In the above-noted embodiment, data portions of a given training ordered set that are used to convey equalization parameter adjustment information may also comprise at least a portion of a training pattern. However, it should be noted that, in alternative embodiments, signals other than the training pattern of an ordered set may be used in evaluating signal quality at the receiver of a given node.

The training ordered sets are preferably transmitted in place of one or more conventional ordered sets which would otherwise be transmitted between the first and second nodes during the speed negotiation process, or at another suitable time during or after initialization of the link. The training ordered sets may also be configured to communicate status indicators for the transmit adaptive equalization process, such as "in process" and "completed" indicators.

The equalization parameters to be adjusted may comprise a plurality of tap coefficients of a finite impulse response (FIR) filter associated with the corresponding node. The information specifying an adjustment to the equalization parameters in this example may comprise, for a particular one of the plurality of coefficients, at least one of an increment coefficient action, a decrement coefficient action, and a hold coefficient action.

In accordance with another aspect of the invention, a proxy mechanism may be used to transmit information between the first and second nodes. For example, such a proxy mechanism may be used to transmit the equalization parameter adjustment information over at least one additional interface other than those associated with first and second ends of the communication link.

Advantageously, the present invention in the illustrative embodiments provides improved responsiveness to variations in channel properties due to temperature, humidity or other environmental factors. Equalization parameter adjustment is provided in a manner that is highly adaptive to such environmental variations.

The illustrative embodiments provide a number of other significant advantages over the conventional techniques previously described. For example, the illustrative embodiments can accommodate higher Fibre Channel data rates, such as 8 Gbps, 16 Gps and higher, without the need for hardware infrastructure upgrades. In addition, substantially improved performance relative to conventional receive-only equalization is provided, with minimal impact to existing protocols of the Fibre Channel standard. Furthermore, the transceiver hardware area and power consumption required for equalization are considerably reduced.

DETAILED DESCRIPTION OF THE INVENTION

The invention will be illustrated herein in conjunction with exemplary communication systems comprising one or more bidirectional point-to-point serial data channels configured in accordance with the ANSI Fibre Channel standard. It should be understood, however, that the invention is more generally applicable to any system comprising one or more serial data channels in which it is desirable to provide improved equalization so as to facilitate operation at high data rates. For example, the described techniques can be adapted in a straightforward manner to other single-lane or multi-lane serial links including, but not limited to, Infini-Band, IEEE 1394, PCI-Express, Ethernet, and certain DWDM or SONET links.

Figure 1:
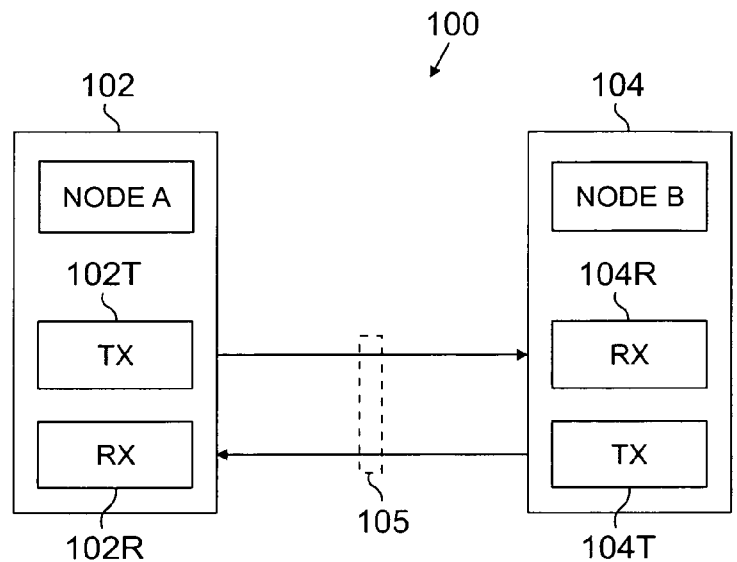
FIGS. 1 and 2 are simplified block diagrams showing exemplary Fibre Channel communication systems in which the present invention is implemented.

FIG. 1 shows a portion of a communication system 100 in which the present invention is implemented. The system 100 comprises a first node 102, also denoted as Node A, and a second node 104, also denoted as Node B. The two nodes are connected by a bidirectional serial data channel transmission medium 105, also referred to herein as a "link." Node A comprises a transmitter 102T configured for communication with a receiver 104R of Node B, and a receiver 102R configured for communication with a transmitter 104T of Node B.

By way of example, Node B in FIG. 1 may be configured as a backplane which connects two switch ASICs implementing E_Ports, not explicitly shown in the figure. Such elements may support multiple data rates, such as, for example, data rates of 4, 8, 10 and 16 Gbps.

Figure 2:
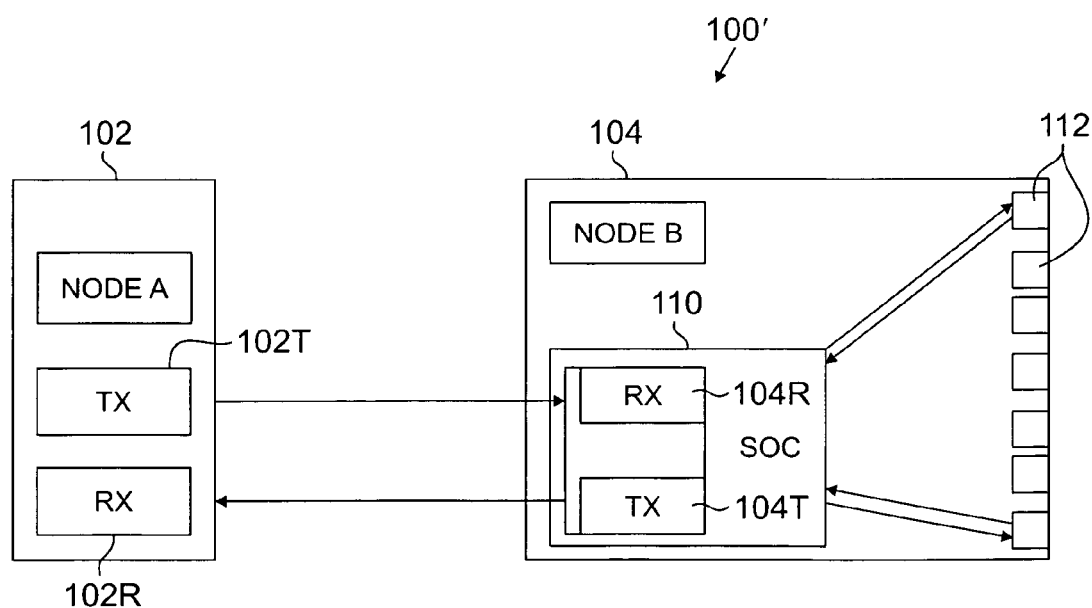

FIG. 2 shows a more detailed view of one possible alternative topology of a system 100' comprising Node A and Node B. In this arrangement, Node B is again configured as a backplane, but this time comprises a Switch On Chip (SOC) element 110 with point-to-point connections to a plurality of NL_Ports or FL_Ports 112 that may be, for example, Fibre Channel Hard Disk Drives (HDDs). Like the NL_Ports in the FIG. 1 example mentioned previously, the elements 112 in this example may support multiple data rates, such as the above-noted data rates of 4, 8, 10 and 16 Gbps.

In both FIG. 1 and FIG. 2, the Node B transceivers are illustratively part of a backplane that is comprised of NL_Ports or FL_Ports. However, the invention is applicable to other types of ports, such as N_Ports, E_Ports and F_Ports on a backplane, or within a fabric, as defined in the above-cited documents of the Fibre Channel standard.

It is to be appreciated that the particular numbers of nodes shown in FIGS. 1 and 2, and their particular topology and configuration, are presented by way of illustrative example only. Other embodiments of the invention can include different numbers and arrangements of nodes. For example, various topologies based on fabric interconnection of the nodes are possible. The invention is also applicable to topologies such as those described in the above-cited FC-DA document of the Fibre Channel standard, as well as other Fibre Channel topologies.

The present invention in the illustrative embodiments provides transmit adaptive equalization in a Fibre Channel system such as system 100 of FIG. 1 or system 100' of FIG. 2.

Generally, a first node, which may be Node A or Node B, is operative to receive from the other node, referred to as a second node, information specifying an adjustment to one or more equalization parameters of the first node. The information is received in designated portions of one or more ordered sets transmitted from the second node to the first node in conjunction with initialization of a communication link between the first and second nodes. The equalization parameter(s) of the first node are then adjusted in accordance with the received information. For example, the equalization parameters may comprise a plurality of tap coefficients of a finite impulse response (FIR) filter associated with the transmitter of the first node, as will be described in greater detail below in conjunction with FIG. 4. Other filter or transform mechanisms may be used to provide the desired equalization functionality. More generally, any appropriate mathematical transform characterized by one or more equalization parameters may be used.

Thus, the invention in the illustrative embodiments provides feedback mechanisms which utilize modified ordered sets, each referred to herein as a training ordered set (TOS), to communicate training patterns and equalization parameter adjustment information between transmitting and receiving nodes.

A given TOS in the illustrative embodiments comprises, in addition to the equalization parameter adjustment information for the node that receives the TOS, a training pattern that is used by the receiving node in evaluating received signal quality and determining equalization adjustment information for the other node. This allows substantially simultaneous transmit adaptive equalization to be provided for both the first node and the second node, utilizing a plurality of ordered sets transmitted between the first and second nodes.

Each of the training ordered sets in the illustrative embodiments thus comprises both a training pattern and equalization parameter adjustment information. For example, a training ordered set transmitted from the first node to the second node may comprise a training pattern that is used by the second node to determine equalization parameter adjustment information for the first node. This training ordered set may also comprise equalization parameter adjustment information for the second node, as determined by the first node. Similarly, a training ordered set transmitted from the second node to the first node may comprise a training pattern that is used by the first node to determine equalization parameter adjustment information for the second node. This training ordered set may also comprise equalization parameter adjustment information for the first node, as determined by the second node.

It is to be appreciated that signals other than the training pattern of an ordered set may be used in evaluating signal quality at the receiver of a given node.

The equalization parameter adjustment process may be repeated iteratively, until the both the first and second nodes arrive at sets of equalization parameters which provide a desired signal quality at their respective receivers.

An advantage of the TOS approach of the illustrative embodiments is that it can be implemented during an otherwise conventional speed negotiation process carried out between the first node and the second node in conjunction with initialization of a Fibre Channel link between the nodes. This allows the speed negotiation and transmit adaptive equalization to be carried out substantially simultaneously with one another in conjunction with initialization of the Fibre Channel link, in a manner compliant with the Fibre Channel standard. Thus, the illustrative embodiments are readily interoperative with legacy systems.

Currently, no mechanism exists in the Fibre Channel standard that allows a receiving node to direct a transmitting node to perform transmit adaptive equalization so as to overcome signal degradation at the receiver. The TOS approach of the illustrative embodiments provides the needed dynamic feedback mechanism for supporting the performance of transmit adaptive equalization in a Fibre Channel system.

In operation, a receiving node evaluates the quality of a signal transmitted by the transmitting node. As indicated above, this signal quality evaluation may be facilitated using a training pattern transmitted from a transmitting node in a TOS. Other signal quality evaluation techniques may be used. Assume the transmitting and receiving nodes are Node A and Node B, respectively, of the example systems shown in FIGS. 1 and 2. Thus, Node B evaluates the quality of a signal transmitted by Node A during the speed negotiation process, preferably using a training pattern in a TOS received from Node A. Following the evaluation of the received signal quality, the transmitter of Node B sends a command to the receiver of Node A requesting an adjustment of the equalization parameters of the transmitter of Node A. This command is preferably transmitted in a TOS sent from Node B to Node A. Node A makes the requested adjustment and transmits the training pattern in another TOS, using the adjusted equalization parameters. This iterative process continues until Node A converges upon suitable equalization parameter values providing a desired signal quality at the receiver of Node B. The iterative process thus converges to a set of equalization parameters leading to the desired signal quality at the Node B receiver.

Of course, the roles of Node A and Node B can be reversed to implement a similar and substantially simultaneous transmit adaptive equalization process for transmission in the opposite direction, that is, with Node B as the transmitting node for which equalization parameters are adjusted responsive to received signal quality determinations at Node A. As mentioned previously, this allows substantially simultaneous transmit adaptive equalization to be provided for both Node A and Node B, utilizing a plurality of ordered sets transmitted between these nodes.

A conventional speed negotiation process carried out between Node A and Node B in the systems of FIGS. 1 and 2 will generally involve transmission of Not Operational State (NOS) and Offline State (OLS) ordered sets for a specified time duration defined in Fibre Channel documents cited above. These ordered sets are transmitted encoded in four 10-bit characters by the transmitting node link layer and decoded to 8-bit characters by the link layer of the receiving node.

A given TOS as described above may be utilized to perform transmit adaptive equalization during the speed negotiation process between Node A and Node B. In such an arrangement, the TOS is preferably transmitted during speed negotiation, in place of the NOS and OLS ordered sets used in conventional practice.

The transmit adaptive equalization process may take place at any convenient time, during or after the initialization of a communication link, but in the illustrative embodiments takes place during the speed negotiation. If signal quality degradation conditions are later detected, for example, due to modifications in the data path, the process can be executed again for a given link without performing speed negotiation.

Figures 3, 4:
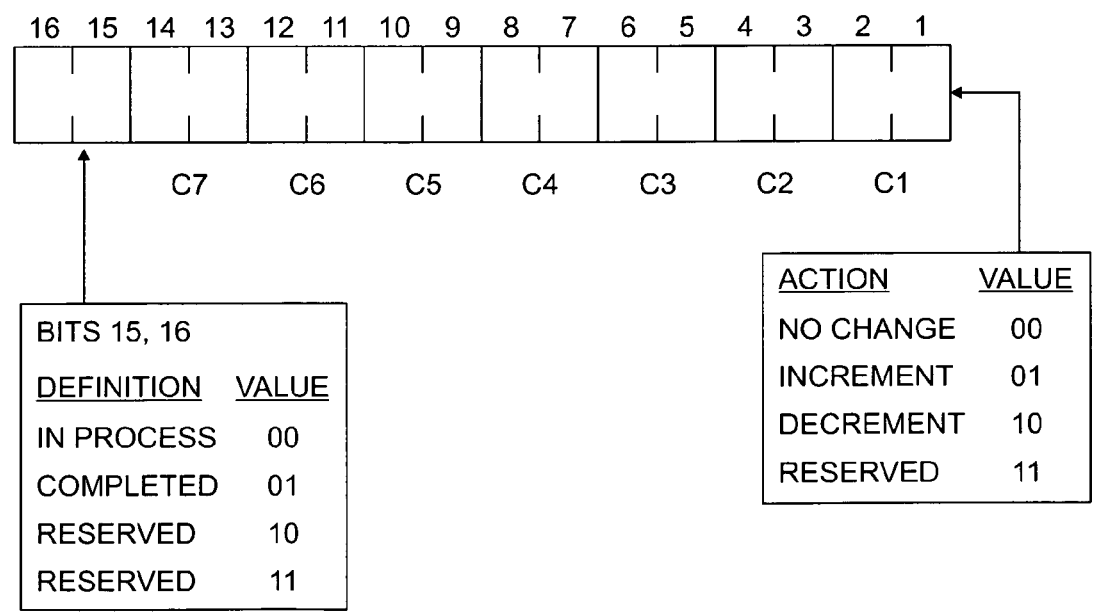
FIG. 3 shows an exemplary training ordered set (TOS) format suitable for use in performance of transmit adaptive equalization in accordance with an illustrative embodiment of the invention.
FIG. 4 is a diagram illustrating the manner in which filter coefficients may be controlled in a transmit adaptive equalization using a TOS format such as that of FIG. 3.

FIG. 3 shows one possible example of a TOS format utilizable in the illustrative embodiments. The TOS format in this example includes first and second ordered sets denoted TOS1 and TOS2. Each ordered set comprises four characters, with each character being 8 bits in length prior to encoding and 10 bits in length after encoding. The first character of each ordered set in this example is the K28.5 control character, and the remaining characters comprise data portions. More specifically, the TOS1 ordered set comprises the K28.5 control character followed by data portions D1, D2 and D3, while the TOS2 ordered set comprises the K28.5 control character followed by data portions D4, D5 and D6. Thus, each of the ordered sets TOS1 and TOS2 is 32 bits in length prior to encoding, and 40 bits in length after encoding.

As will be described below, the illustrative embodiments utilize two of the data portions D1, D2, D3, D4, D5 and D6 to transmit from Node B to Node A information specifying an adjustment to one or more equalization parameters of Node A. More specifically, data portions D5 and D6 are utilized, for a total of 16 bits prior to encoding, to convey the equalization parameter adjustment commands from Node B to Node A. The control characters and data portions of TOS1 and TOS2 also comprise the above-mentioned training pattern, used by a receiving node to evaluate signal quality.

Thus, this exemplary TOS format comprises both equalization parameter adjustment information and one or more training patterns. The data portions of TOS1 and TOS2 that are used for equalization parameter adjustment may also be used as part of the training pattern, but this is not a requirement of the invention.

It should be noted that, for Fibre Channel, the data portions D1 and D4 of TOS1 and TOS2 in the illustrative embodiments cannot take on the following predefined values, because those values are reserved for other Fibre Channel functions:

D5.4 (CLS)
D9.0 (LPB)
D9.2 (LR)
D10.4 (EOF/SOF)
D10.5 (EOF/SOF)
D17.4 (Full Dplx)
D20.4 (ARB)
D5.0 (LPE)
D21.0 (LIP)
D21.1 (OLS)
D21.2 (NOS)
D21.4 (EOF/SOF)
D21.5 (SOF/EOF)
D21.7 (VC_RDY)
D31.3 (CLK SYNC X)
D31.5 (CLK SYNC Y)
D31.6 (CLK SYNC Z)
D31.2 (MARK)

FIG. 4 shows the manner in which data portions D5 and D6 of TOS2 are utilized to carry information specifying adjustments to one or more equalization parameters of a given node. The two data portions D5 and D6 are treated as a single 16-bit command structure organized in the manner shown in the figure.

In the FIG. 4 example, the first fourteen bits of the 16-bit command structure comprise coefficient update bits (bits 1 to 14), also referred to as "Action" bits. In the coefficient update bits, there are two bits for each of seven coefficients. The seven coefficients, each of which corresponds to a tap of an FIR filter, are denoted C1, C2, C3, C4, C5, C6 and C7. For each of the coefficients, a corresponding action is encoded using the associated pair of bits. The possible actions in this example include Hold, Decrement, and Increment, encoded by bit pairs 00, 01, and 10, respectively. In the case of a given Hold action, also referred to as a No Change action, the corresponding coefficient remains unchanged, while for Decrement or Increment actions, the corresponding coefficients are adjusted downward or upward, respectively, by a designated amount. The particular amount of the adjustment will typically depend on implementation-specific factors, such as the type of equalization algorithm being used, and numerous suitable arrangements will be readily apparent to those skilled in the art. Other encodings of transmit parameters may be used depending on the choice of transmit adaptive equalization mechanism and the operations that may be convenient to apply to the present equalization parameter values.

The final two bits (bits 15 and 16) of the 16-bit command structure in FIG. 4 are used to convey additional information, including "in process" and "completed" status indicators for the transmit adaptive equalization process. This allows TOS values containing no information to be passed if there are latencies in coefficient value calculation or differences in convergence rate between the two ends of a link.

The transmit adaptive equalization process may be considered complete for a given node, e.g., Node A, when the coefficient update bits for each of the coefficients are set to the Hold value (00), and bits 15 and 16 are set to the Completed value (01). This indicates that optimum coefficients have been established for all filter taps, and that Node A is to hold these values until otherwise instructed by Node B. The Hold value may be set even in the absence of perfect convergence when the receiver has detected that an adequate approximation to perfect convergence has been achieved. Such cases may occur when, after a certain amount of time, the receiver has been unable to improve upon the transmitter behavior, for example, because the transmitter parameters are cycling near an optimum or because the transmitter does not have an operational transmit equalization circuit.

The FIG. 4 example supports parallel update of transmitter FIR coefficients to a maximum of seven taps, although the technique can be adapted in a straightforward manner to handle more or fewer taps. It is not necessary for a given implementation to support all of the taps that can be accommodated by the command format. The technique does not require any particular tap weight resolution, and is tolerant of corrupted or lost coefficient updates. Actions applied to unsupported taps are ignored.

It should be understood that the particular TOS format and command structure shown in FIGS. 3 and 4 are presented by way of illustrative example only, and numerous alternative arrangements may be used. The particular TOS format and command structure selected for use in a given embodiment may depend upon factors such as the requirements of the particular serial link or other serial data channel being implemented. As another example, it is possible to utilize a TOS format which includes more or fewer that the two ordered sets TOS1 and TOS2 shown in the FIG. 3 example, or an ordered set comprising more or fewer than the two bytes used in the FIG. 4 example.

As noted above, data portions D5 and D6 of TOS2 are used in the illustrative embodiments to convey the coefficient adjustment information. The K28.5 control characters and all data portions, including those data portions used to convey coefficient adjustment information, may be used as training patterns for evaluation of received signal quality. The data portions in the illustrative embodiments are designed to be DC balanced and to comprise valid 8b10b data characters as defined in the Fibre Channel standard. In other embodiments, the data portions may be designed to exhibit other characteristics suitable for facilitating the received signal quality determination.

During the speed negotiation process, the NOS and OLS ordered sets which would otherwise be transmitted in conventional practice are replaced with the TOS ordered sets as described above in order to perform transmit adaptive equalization. The two ordered sets TOS1 and TOS2 are preferably treated as comprising a single atomic operation by the transmitting and receiving nodes. Transmission of these two ordered sets is repeated for the time duration of the speed negotiation process.

Figure 5:
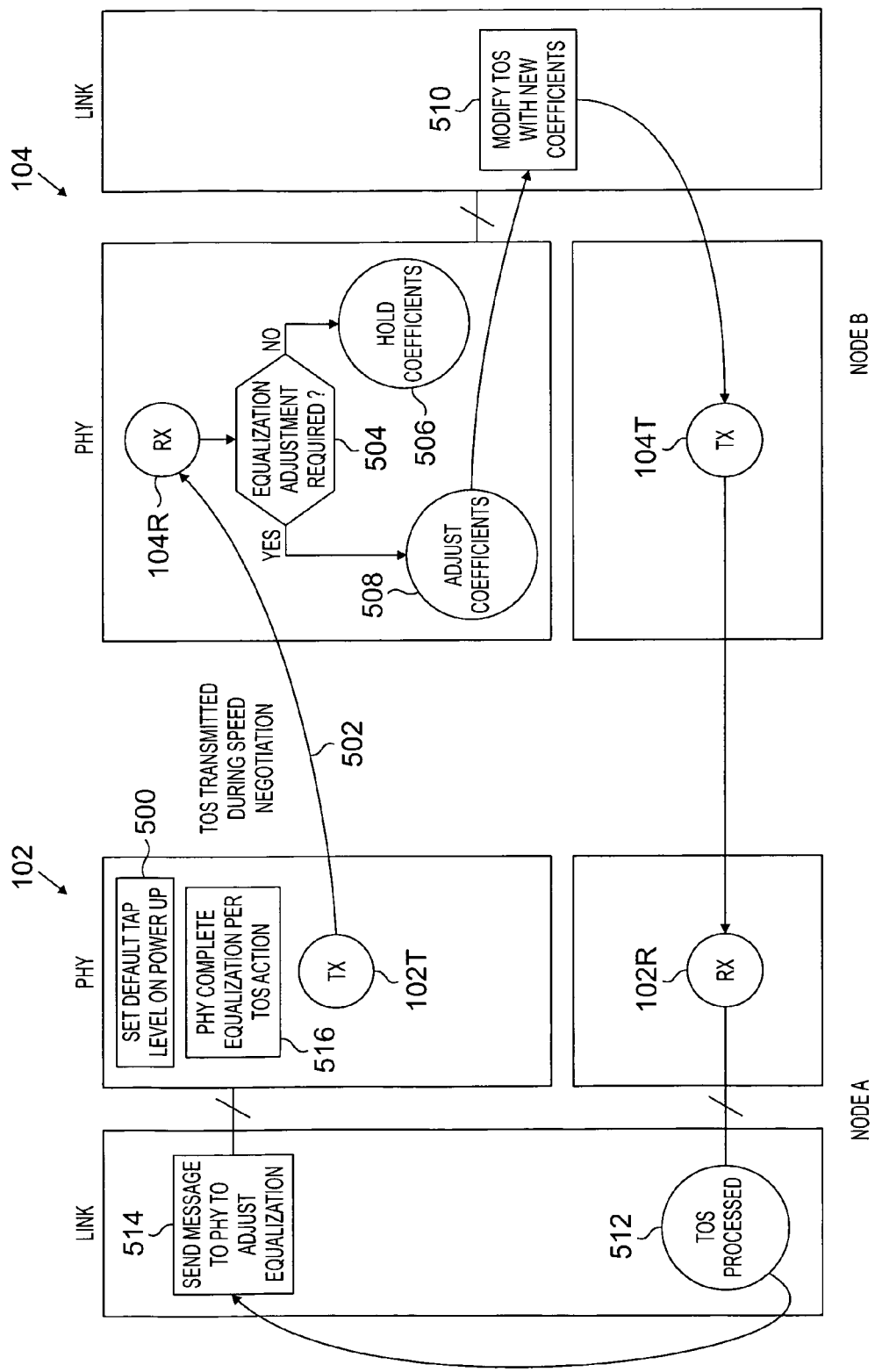
FIG. 5 is a flow diagram illustrating one possible implementation of transmit adaptive equalization using the TOS approach of FIGS. 3 and 4.

FIG. 5 is a flow diagram illustrating transmit adaptive equalization using the TOS ordered sets described above. In this example, each of Node A and Node B of system 100 or 100' is separated into a link layer portion and a physical layer (PHY) portion of the Fibre Channel standard as indicated. As noted previously, the transmit adaptive equalization is carried out during speed negotiation, and thus prior to the establishment of an operational Fibre Channel link between Node A and Node B.

In step 500, Node A will set default tap levels on power up. Nodes A and B are also initialized with preliminary receive equalization parameters. These default and preliminary settings will provide sufficient signal quality to allow performance of the adaptive equalization process using the TOS ordered sets.

Then, as indicated at 502, the TOS ordered sets TOS1 and TOS2 are transmitted from transmitter 102T of Node A to receiver 104R of Node B during speed negotiation. The receiver 104R of Node B will evaluate signal quality using the training patterns, and will determine in step 504 if an equalization adjustment is required. If an adjustment is not required, a decision is made in step 506 to hold the coefficients at their current values. If an adjustment is required, a determination is made in step 508 to adjust the coefficients, and the D5 and D6 data portions of TOS2 are adjusted in step 510 in accordance with the FIG. 4 command structure to convey the coefficient adjustment commands from transmitter 104T of Node B to receiver 102R of Node A.

In step 512, Node A processes the received TOS in its link layer portion, and in step 514 the link layer portion sends a message to the physical layer portion specifying the requested equalization adjustment. The equalization adjustment is then completed by the physical layer portion of Node A in accordance with the specified TOS actions, as indicated in step 516.

The monitoring of received signal quality and adjustment of equalization parameters may be repeated until a desired received signal quality is achieved at the receiver 104R of Node B. The granularity of adjustment and the magnitude of change for each iteration should be selected to assure stability in the convergence to the desired received signal quality levels. As described previously, the transmit adaptive equalization process may be considered complete when the coefficient update bits for each of the supported coefficients are set to the Hold value (00), and bits 15 and 16 are set to the Completed value (01).

Figure 6:
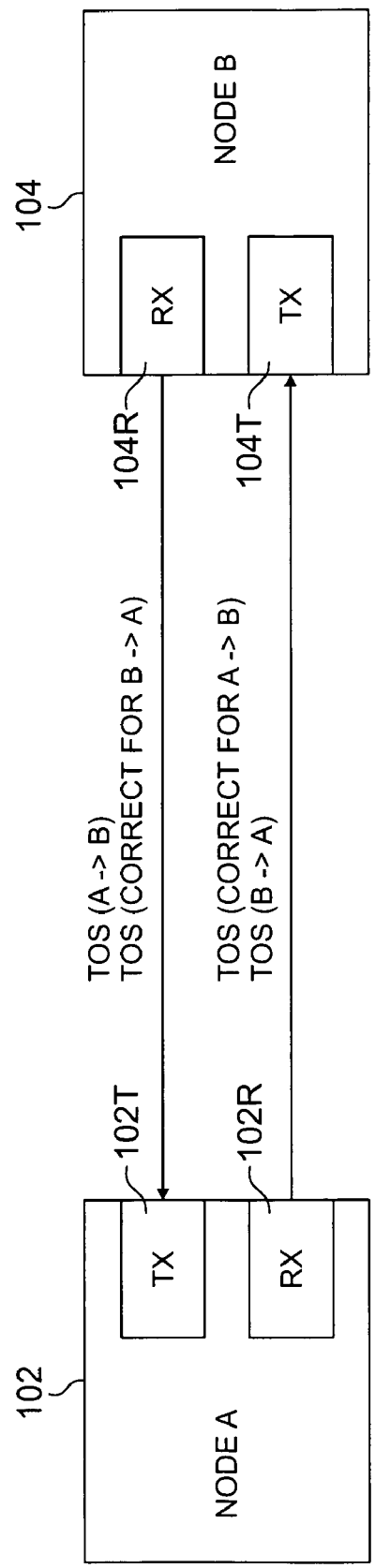
FIGS. 6 and 7 show additional examples of transmit adaptive equalization performed in accordance with the present invention.

Although FIG. 5 illustrates the adjustment of equalization parameters of Node A using information transmitted from Node B, similar adjustment can be implemented in the opposite direction at substantially the same time, as in the FIG. 6 example to be described below.

Of course, the particular process steps of FIG. 5 may be altered in other embodiments of the invention.

It should be noted that the transmit adaptive equalization as described herein can be implemented in conjunction with otherwise conventional receive equalization.

As noted previously, the TOS ordered sets may be used to perform transmit adaptive equalization at Node B as well as at Node A. An example of an arrangement of this type is illustrated in FIG. 6, which shows TOS ordered sets being transmitted from Node A to Node B for use in generating coefficient adjustment commands which are sent from Node B back to Node A, to provide transmit adaptive equalization at Node A as in the FIG. 5 example. However, FIG. 6 further shows TOS ordered sets being transmitted from Node B to Node A for use in generating coefficient adjustment commands which are sent from Node A back to Node B so as to provide transmit adaptive equalization at Node B. Thus, the TOS approach can be used to provide substantially simultaneous transmit adaptive equalization for both Node A and Node B during a speed negotiation process between Node A and Node B.

Figure 7:
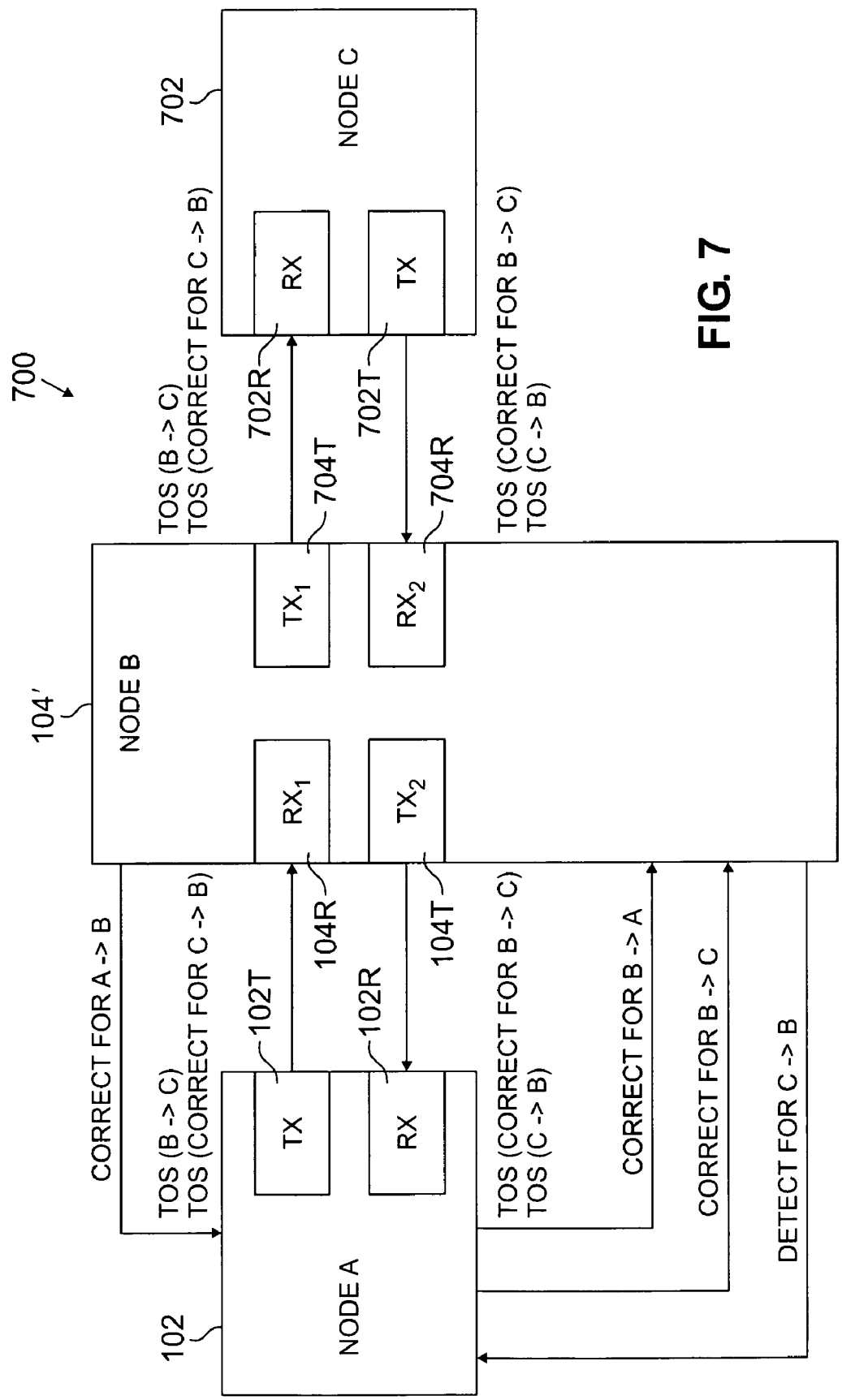

FIG. 7 shows an arrangement in which a proxy mechanism is utilized in performing transmit adaptive equalization for Nodes A and B. A system 700 comprises Nodes A and B as previously described and an additional node, denoted Node C. Node B is coupled between Node A and Node C as shown. Node C comprises receiver 702R and transmitter 702T. Node B in this embodiment comprises an additional transceiver including transmitter 704T, which communicates with receiver 702R of Node C, and receiver 704R, which communicates with transmitter 702T of Node C.

This arrangement is an example of one in which the adaptive equalization information sent in the TOS ordered sets is transmitted by additional interfaces other than those associated with the link being optimized. Numerous other arrangements, involving three or more nodes, may be configured in a straightforward manner.

The FIG. 7 example assumes Node A and B reside within a single system and have out-of-band communication capability. The example further assumes that Node C is remote and has only TOS communication capability to Node A. As indicated in the figure, proxy information is used for the following operations:

1. Adjusting filter coefficients of Node A transmitter 102T based on information detected by Node B receiver 104R.

2. Adjusting filter coefficients of Node B transmitter 704T based on information detected by Node C receiver 702R, transmitted using TOS to Node A and forwarded out-of-band to Node B.

3. Adjusting filter coefficients of Node C transmitter 702T based on information detected by Node B receiver 704R, transmitted out-of-band to Node A and forwarded using TOS to Node C.

4. Adjusting filter coefficients of Node B transmitter 104T using information detected by Node A receiver 102R, and transmitted out-of-band to Node B.

The numerical ordering of the operations in the foregoing list should not be construed as a requirement that the operations be performed in any particular order. Thus, the order in which the operations may be performed can vary from the above-listed order. Also, alternative or additional operations may be used, depending upon the requirements of a given embodiment.

Advantageously, the present invention in the illustrative embodiments described above can accommodate higher Fibre Channel data rates, such as 8 Gbps, 16 Gps and higher, without the need for hardware infrastructure upgrades. In addition, substantially improved performance relative to conventional receive-only equalization is provided, with minimal impact to the existing protocols of the Fibre Channel standard. Furthermore, the transceiver hardware area and power consumption required for equalization are considerably reduced.

Other advantages associated with the illustrative embodiments include the fact that the equalization process can be used to optimize the transmit equalization settings for both nodes. Also, because the transmit adaptive equalization is performed in conjunction with speed negotiation between the nodes, no changes in the timing of relevant events are required. The invention also provides a "plug and play" capability in that a given system can be configured to automatically negotiate the proper equalization parameters for any channel without user intervention.

A further significant advantage of the illustrative embodiments is that they provide improved responsiveness to variations in channel properties due to temperature, humidity or other environmental factors.

The present invention may be implemented in the form of one or more integrated circuits. For example, a given system node in accordance with the invention may be implemented as one or more integrated circuits comprising at least one processor and at least one memory. Numerous other configurations are possible.

In such an integrated circuit implementation, a plurality of identical die are typically formed in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

The present invention may also be implemented at least in part in the form of one or more software programs that, within a given node, are stored in memory and run on a processor. Such node processor and memory elements may comprise one or more integrated circuits.

Again, it should be emphasized that the embodiments of the invention as described herein are intended to be illustrative only.

For example, the Fibre Channel interface used in the illustrative embodiments may be replaced with another type of standard serial data channel interface, or a non-standard serial data channel interface, as well as combinations of standard and non-standard interfaces. As a more particular example, and as indicated previously herein, the techniques of the present invention can be adapted in a straightforward manner for use over other single-lane and multi-lane serial links including, but not limited to Infini-Band, IEEE 1394, PCI-Express, Ethernet, and certain DWDM or SONET links. As described above, in the illustrative Fibre Channel embodiments, four-character-long ordered sets designated by a special control character are used to carry adaptive equalization information. Other serial links may use other characters or frames to carry such information, and such alternative arrangements are intended to be encompassed by the term "ordered set" as used herein. Whatever mechanism is appropriate to a given serial link may be used in place of the particular ordered sets of the illustrative embodiments. Also, the particular arrangements of system devices, command formats, and adaptive equalization processes as shown in the figures may be varied in alternative embodiments. These and numerous other alternative embodiments within the scope of the following claims will be readily apparent to those skilled in the art.

What is claimed is:

1. An apparatus for use in a communication system having a plurality of nodes, the apparatus comprising;
   a first node, the first node comprising a transmitter configured for communication with a receiver of a second node and a receiver configured for communication with a transmitter of the second node;
   the first node being operative to receive from the second node information specifying an adjustment to one or more equalization parameters of the first node;
   the information being received in designated portions of one or more ordered sets transmitted from the second node to the first node in conjunction with initialization of a communication link between the first and second nodes;
   the first node being further operative to adjust the one or more equalization parameters in accordance with the received information;
   wherein the one or more ordered sets comprise at least one training ordered set transmitted from the second node to the first node during a speed negotiation process carried out between the first node and the second node in conjunction with initialization of the communication link.

2. The apparatus of claim 1 wherein the training ordered set comprises a training pattern that is utilized by the second node in determining the information specifying an adjustment to one or more equalization parameters of the first node.

3. The apparatus of claim 1 wherein substantially simultaneous transmit adaptive equalization is provided for both the first node and the second node, utilizing a plurality of training ordered sets transmitted between the first and second nodes during the speed negotiation process, each training ordered set comprising a training pattern and equalization parameter adjustment information.

4. The apparatus of claim 1 wherein the first node is coupled to the second node via a bidirectional serial data channel.

5. The apparatus of claim 1 wherein the first node is configured to communicate with the second node over a Fibre Channel link.

6. The apparatus of claim 1 wherein the second node evaluates signal quality of a signal transmitted by the transmitter of the first node, and determines the information specifying the adjustment to the one or more equalization parameters based on the signal quality evaluation.

7. The apparatus of claim 1 wherein a transmit adaptive equalization process comprising transmitting a signal and receiving information specifying an adjustment to one or more equalization parameters is repeated until signal quality of a given transmitted signal as received at the second node is determined to meet one or more designated criteria.

8. The apparatus of claim 1 wherein the one or more equalization parameters comprise a plurality of tap coefficients of a filter associated with the transmitter of the first node.

9. The apparatus of claim 8 wherein the filter comprises a finite impulse response filter.

10. The apparatus of claim 1 wherein the information specifying an adjustment to one or more equalization parameters of the transmitter of the first node comprises for a particular one of a plurality of coefficients at least one of an increment coefficient action, a decrement coefficient action, and a hold coefficient action.

11. The apparatus of claim 1 wherein the information specifying an adjustment to one or more equalization parameters of the first node is transmitted utilizing a proxy mechanism in which the information is transmitted over at least one additional interface other than those associated with first and second ends of the communication link.

12. The apparatus of claim 1 wherein the first node is implemented at least in part as an integrated circuit.

13. An apparatus for use in a communication system having a plurality of nodes, the apparatus comprising:
   a first node, the first node comprising a transmitter configured for communication with a receiver of a second node and a receiver configured for communication with a transmitter of the second node;
   the first node being operative to receive from the second node information specifying an adjustment to one or more equalization parameters of the first node;
   the information being received in designated portions of one or more ordered sets transmitted from the second node to the first node in conjunction with initialization of a communication link between the first and second nodes;

the first node being further operative to adjust the one or more equalization parameters in accordance with the received information;

wherein the one or more ordered sets comprise at least first and second training ordered sets, each of the first and second training ordered sets comprising a control character and a plurality of data portions, wherein the information specifying an adjustment to one or more equalization parameters of the first node is transmitted in particular bit positions of one or more of the data portions of at least one of the training ordered sets.

14. The apparatus of claim 13 wherein a given one of the training ordered sets comprises an 8-bit control character and three 8-bit data portions.

15. The apparatus of claim 13 wherein the training ordered sets are transmitted in place of one or more Not Operational State (NOS) and Offline State (OLS) ordered sets which would otherwise be transmitted between the first and second nodes during a speed negotiation process.

16. The apparatus of claim 13 wherein the training ordered sets are configured to communicate one or more status indicators for a transmit adaptive equalization process carried out between the first and second nodes.

17. The apparatus of claim 16 wherein the status indicators comprise an in process indicator and a process completed indicator.

18. An apparatus for use in a communication system having a plurality of nodes, the apparatus comprising:

a first node, the first node comprising a transmitter configured for communication with a receiver of a second node and a receiver configured for communication with a transmitter of the second node;

the first node being operative to receive from the second node information specifying an adjustment to one or more equalization parameters of the first node;

the information being received in designated portions of one or more ordered sets transmitted from the second node to the first node in conjunction with initialization of a communication link between the first and second nodes;

the first node being further operative to adjust the one or more equalization parameters in accordance with the received information;

wherein the information specifying an adjustment to one or more equalization parameters of the first node is transmitted with a training pattern, utilizing an ordered set format compatible with the Fibre Channel standard.

19. An integrated circuit for use in a communication system having a plurality of nodes, the integrated circuit implementing at least a portion of a first node, the first node comprising a transmitter configured for communication with a receiver of a second node and a receiver configured for communication with a transmitter of the second node, the first node being operative to receive from the second node information specifying an adjustment to one or more equalization parameters of the first node, the information being received in designated portions of one or more ordered sets transmitted from the second node to the first node in conjunction with initialization of a communication link between the first and second nodes, and to adjust the one or more equalization parameters in accordance with the received information, wherein the one or more ordered sets comprise at least one training ordered set transmitted from the second node to the first node during a speed negotiation process carried out between the first node and the second node in conjunction with initialization of the communication link.

20. A method for use in a communication system having a plurality of nodes, including at least a first node comprising a transmitter configured for communication with a receiver of a second node and a receiver configured for communication with a transmitter of the second node, the method comprising the steps of:

receiving in the first node from the second node information specifying an adjustment to one or more equalization parameters of the first node, the information being received in designated portions of one or more ordered sets transmitted from the second node to the first node in conjunction with initialization of a communication link between the first and second nodes; and adjusting the one or more equalization parameters in accordance with the received information;

wherein the one or more ordered sets comprise at least one training ordered set transmitted from the second node to the first node during a speed negotiation process carried out between the first node and the second node in conjunction with initialization of the communication link.

21. An article of manufacture comprising a machine-readable storage medium having one or more software programs stored therein, for use in a communication system having a plurality of nodes, including at least a first node comprising a transmitter configured for communication with a receiver of a second node and a receiver configured for communication with a transmitter of the second node, the first node being operative under control of the one or more software programs to perform the steps of:

receiving from the second node information specifying an adjustment to one or more equalization parameters of the first node, the information being received in designated portions of one or more ordered sets transmitted from the second node to the first node in conjunction with initialization of a communication link between the first and second nodes; and adjusting the one or more equalization parameters in accordance with the received information;

wherein the one or more ordered sets comprise at least one training ordered set transmitted from the second node to the first node during a speed negotiation process carried out between the first node and the second node in conjunction with initialization of the communication link.

* * * * *